(12) United States Patent
Chang et al.

(10) Patent No.: US 6,493,136 B2
(45) Date of Patent: Dec. 10, 2002

(54) CLIP-ON OPTICAL MOUNTING STRUCTURE

(75) Inventors: Byung Jin Chang, Ann Arbor, MI (US); Thomas A. Cummings, Jackson, MI (US)

(73) Assignee: General Scientific Corp., Ann Arbor, MI (US)

( * ) Notice: Subject to any disclaimer, the term of this patent is extended or adjusted under 35 U.S.C. 154(b) by 0 days.

(21) Appl. No.: 09/800,799

(22) Filed: Mar. 7, 2001

(65) Prior Publication Data

US 2002/0126376 A1 Sep. 12, 2002

(51) Int. Cl.[7] .............................. G02B 23/00; G02C 1/00
(52) U.S. Cl. ........................... 359/399; 351/47; 351/59; 351/158; 359/407
(58) Field of Search ................................. 359/362, 399, 359/407–409, 480–482; 351/58, 158, 47–48, 52, 57

(56) References Cited

U.S. PATENT DOCUMENTS

| | | | |
|---|---|---|---|
| 2,300,364 A | * | 10/1942 | Wagner |
| 3,600,069 A | * | 8/1971 | McNeill |
| 3,876,295 A | * | 4/1975 | Loughner |
| 4,647,165 A | * | 3/1987 | Lewis |
| 5,541,767 A | * | 7/1996 | Murphy et al. |
| 5,667,291 A | * | 9/1997 | Caplan et al. |
| 5,870,166 A | * | 2/1999 | Chang et al. |

\* cited by examiner

*Primary Examiner*—Thong Nguyen
(74) *Attorney, Agent, or Firm*—Gifford, Krass, Groh, Sprinkle, Anderson & Citkowski, PC

(57) ABSTRACT

An optical accessory of the type used by medical professionals is coupled to a clip-on mount, enabling the assembly to be used with ordinary eyeglass frames. The assembly may be used with specialized frames, in which case the clip-on mount may be removed for a more permanent mounting of the assembly directly to the bridge area of the eyeglass frames. In different implementations, optical accessories in the form of ocular loupes, head lamps, and miniaturized video cameras may be accommodated according to the invention.

6 Claims, 4 Drawing Sheets

CLIP-ON OPTICAL MOUNTING STRUCTURE

FIELD OF THE INVENTION

This invention related generally to optical devices of the kind used in medical, dental and surgical procedures and, more particularly, to apparatus for mounting such devices onto a conventional pair of eyeglass frames.

BACKGROUND OF THE INVENTION

There does exist ocular/loupe assemblies mounted to eyeglass frames, as described in U.S. Pat. No. 5,381,263, the entire contents of which are incorporated herein by reference. Although such a configuration does provide a stable and multi-adjustable viewing arrangement, it requires the use of dedicated eyeglass frames to receive a particularized mounting structure.

There are also clip-on optical accessories, as known in the art. However, such devices concern general consumer eyewear and not medical or surgical devices. The need remains, therefore, for an optical mounting assembly that may be used with ordinary eyeglass frames, so that medical, dental and surgical practitioners may wear the glasses that they are used to.

SUMMARY OF THE INVENTION

In broad and general terms, this invention combines an optical accessory of the type used by medical professionals with a clip-on mount, enabling the entire assembly to be used with ordinary eyeglass frames. In an alternative embodiment, however, the assembly may be used with specialized frames, in which case the clip-on mount may be removed for a more permanent mounting of the assembly directly to the bridge area of the eyeglass frames.

In different implementations, optical accessories in the form of ocular loupes, head lamps, and miniaturized video cameras may be accommodated according to the invention.

DETAILED DESCRIPTION OF THE INVENTION

Figure 1:
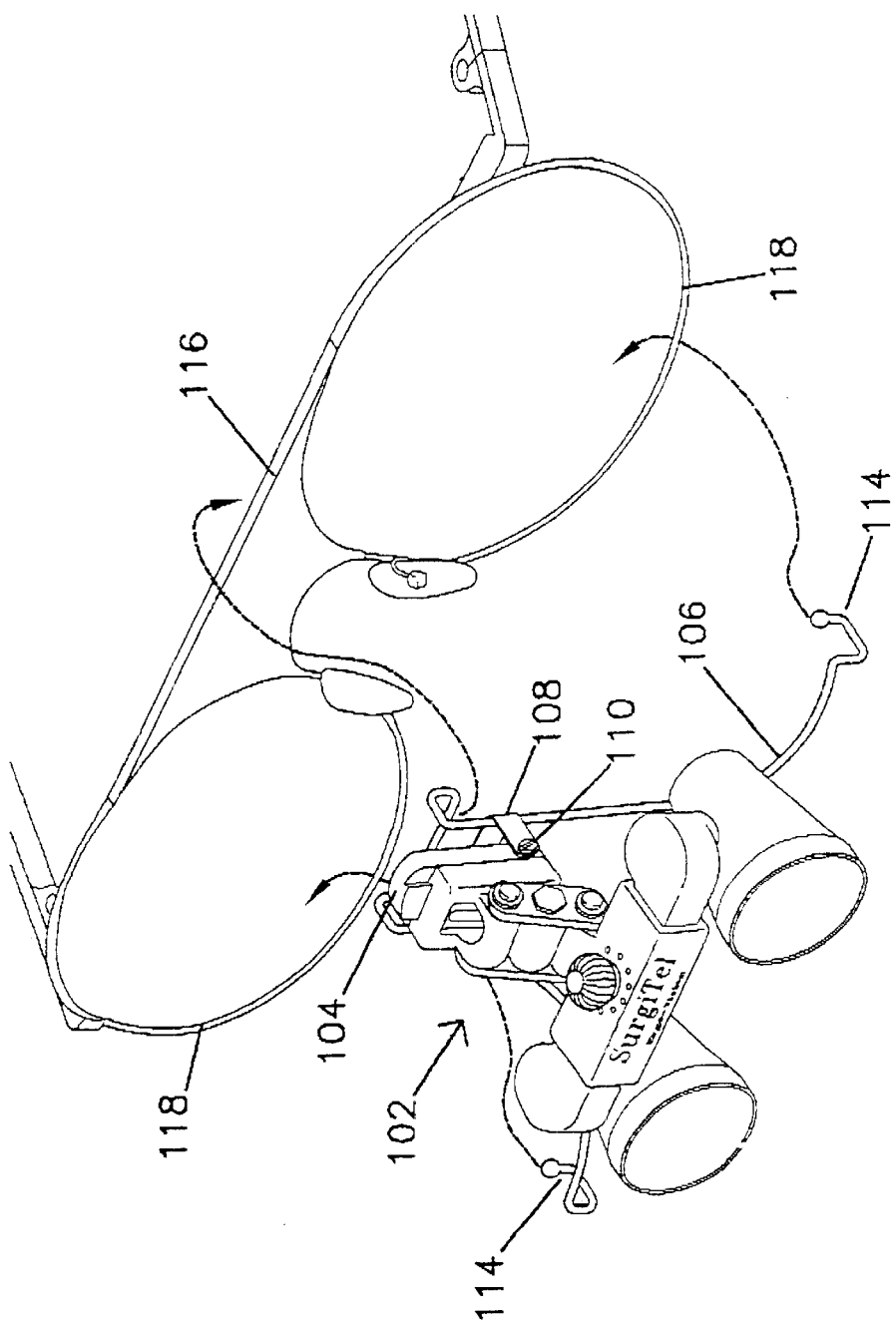
FIG. 1 is a drawing of a preferred ocular mounting assembly according to the invention including a clip-on structure enabling the assembly to be mounted to an ordinary pair of eyeglass frames.
Figure 2:
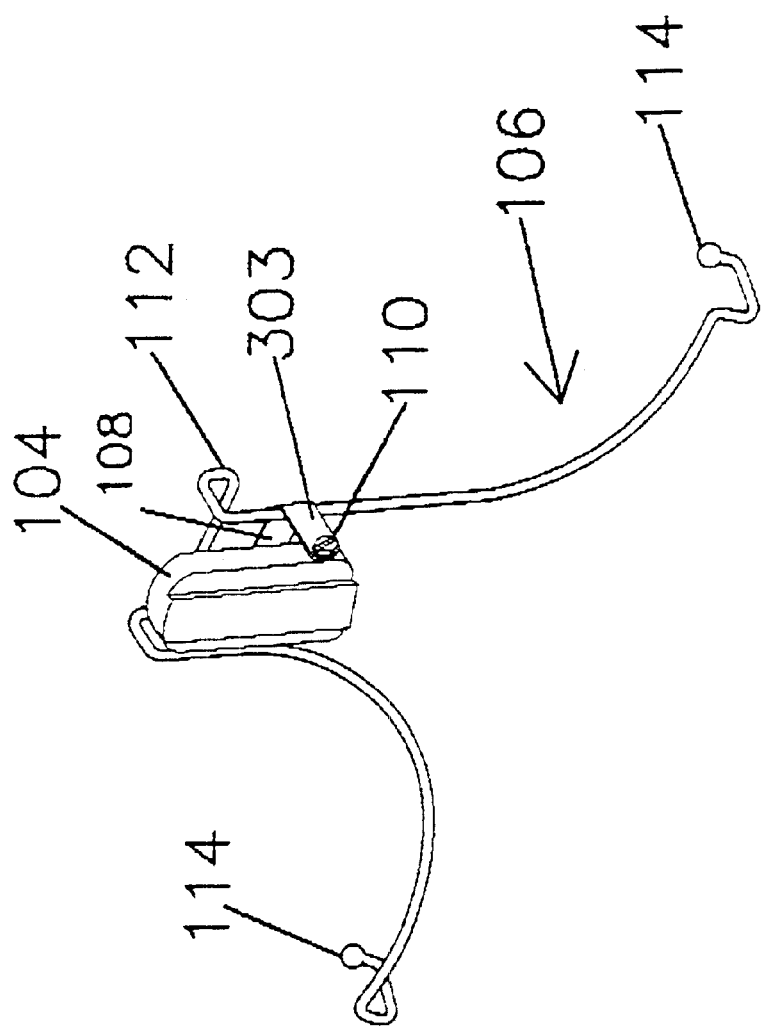
FIG. 2 is a close-up drawing of the clip structure proper.

FIGS. 1 and 2 illustrate the use of the invention with respect to a multi-degree of freedom ocular mounting assembly of the type described in U.S. Pat. No. 5,381,263. The ocular mounting assembly 102 includes loupes, which are attached through a multiple-degree of freedom hinge assembly to a vertical adjustment rail 104 as described in the '263 patent. However, as opposed to a direct mounting of the vertical adjustment rail to the bridge area, an adjustable wire structure 106 is used. According to the invention, this clip-on structure enables the assembly to be mounted to an ordinary pair of eyeglass frames.

The wire structure 106 includes bent end portions 114, which engage with the lower portions of the lens portions of the eyeglasses 118. The wire structure 106 further includes an upper hook portion 112 adapted to engage with the upper portion of the bridge member 116. The material comprising the wire structure 106 is such that it may be angled by a user prior to installation to ensure that it engages tenaciously at these three points, thereby holding the mounting assembly 102 in place in a secure manner.

As a further level of adjustment, note that the wire structure 106 is held to the vertical slide rail 104 through a crimped member 108 having a tab which engages with a slot (not viewable in FIG. 1) which may be tightened by side knob 110 thereby changing the angle of the wire structure relative to the mounting assembly 102 providing yet a further degree of freedom.

FIG. 2 is a close-up drawing of the clip structure proper, showing the crimped member 108 having tabs 303 which are received by slots in the vertical slide member 104, with the adjustment knobs 110 being used to squeeze the material adjacent the tabs 303, thereby holding the structure 106 into place.

Figure 3:
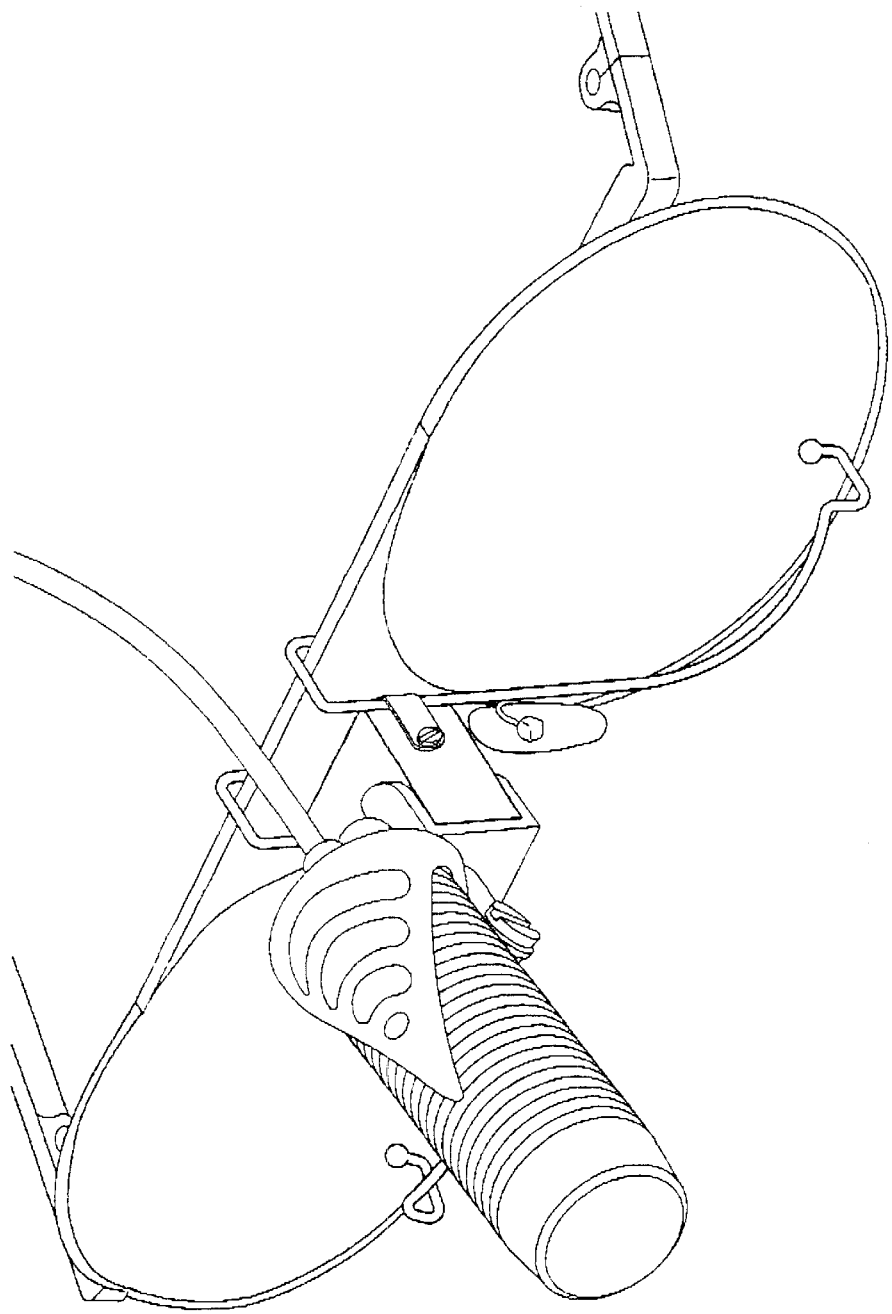
FIG. 3 is a drawing which illustrates the applicability of the invention to a head-mounted lamp accessory.
Figure 4:
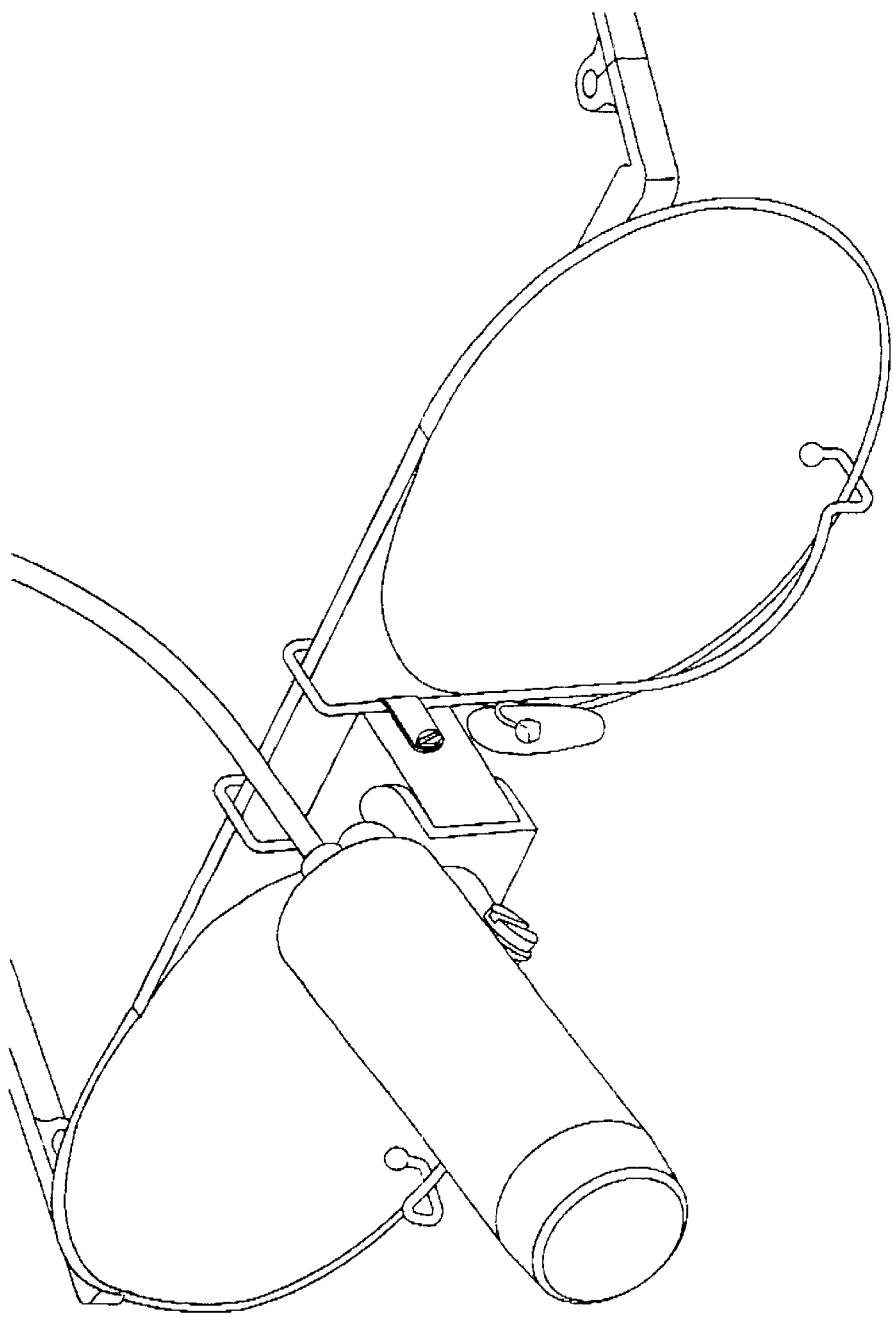
FIG. 4 is a drawing which illustrates the applicability of the invention to a head-mounted video camera.

As discussed elsewhere herein, the invention is not limited to the mounting of an optical loupe assembly. FIG. 3 illustrates the applicability of the invention to a head-mounted lamp, which may have an integral bulb or fiber-optic connection, and FIG. 4 shows the use of the invention with respect to the mounting of a miniaturized video camera.

We claim:

1. An optical mounting assembly adapted to be received by an ordinary pair of eyeglass frames having a bridge member and lenses having lower edges, the mounting assembly comprising:

a base unit;

a spring structure coupled to the base unit, the spring structure including a plurality of prongs, including an upper prong that engages with the bridge member and a pair of side prongs, each of which engages with the lower edge of one of the respective lenses; and an optical visualization assistance device mounted to the base unit.

2. The optical mounting assembly of claim 1, wherein the visualization assistance device includes a pair of optical telescopic loupes.

3. The optical mounting assembly of claim 1, wherein the visualization assistance device is an illuminator.

4. The optical mounting assembly of claim 1, wherein the visualization assistance device is a miniature video camera.

5. The optical mounting assembly of claim 1, further including a rotatable coupling between the spring structure and the base unit.

6. The optical mounting assembly of claim 1, wherein the base unit includes a vertical slide rail enabling the visualization assistance device to be translated up and down relative to the eyeglass frames.

* * * * *